(12) United States Patent
Ozawa (10) Patent No.: US 6,330,095 B1
(45) Date of Patent: Dec. 11, 2001

(54) BEAM SCANNING APPARATUS (75) Inventor: Takeshi Ozawa, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/487,292

(22) Filed: Jan. 19, 2000

(30) Foreign Application Priority Data

Jan. 19, 1999 (JP) .................................................. 11-10213

(51) Int. Cl.⁷ .................................................. G02B 26/08
(52) U.S. Cl. .......................................... 359/210; 359/199
(58) Field of Search .................................. 359/196, 197, 359/199, 209, 210

(56) References Cited

U.S. PATENT DOCUMENTS 5,072,114 * 12/1991 Takada ................................. 250/235
5,303,080 * 4/1994 O'Brien et al. ..................... 359/196

FOREIGN PATENT DOCUMENTS 9-274076   10/1997   (JP) .

* cited by examiner

Primary Examiner—Cassandra Spyrou
Assistant Examiner—Mark A. Robinson
(74) Attorney, Agent, or Firm—Sughrue Mion, PLLC (57) ABSTRACT

A beam scanning apparatus is used for scanning a target region through use of an optical beam. Light emitted from the light source is transformed into a parallel optical beam by a collimator lens. A drive mechanism directly moves the collimator lens along a predetermined travel path reciprocally while the primary optical axis of the light emitted from the light source and the optical axis of the collimator lens are placed in a single plane in order to sweep the optical beam over the target region. A stopper mechanism limits the movement of the collimator lens in order to mitigate load imposed on the drive mechanism for reversing the direction of movement of the collimator lens. The stopper mechanism is provided at least one of the points where the direction of reciprocal movement of the collimator lens is switched from one to the other.

16 Claims, 6 Drawing Sheets

BEAM SCANNING APPARATUS

BACKGROUND OF THE INVENTION

The present invention relates to a beam scanning apparatus for two-dimensionally scanning over a region which is an object of measurement through use of an optical beam, such as a laser beam.

A commonly employed apparatus for measuring the distance between vehicles (hereinafter referred to simply as a "inter-vehicle distance measurement apparatus") basically comprises an optical beam scanning device for two-dimensionally scanning over a forward region which is an object of measurement (hereinafter referred to as a "forward region") through use of a laser beam; a light-receiving device for receiving reflected light of the thus-emitted laser beam; and a computation device for computing the distance between vehicles on the basis of the characteristics of the light received by the light-receiving device. For example, Japanese Patent Publication No. 9-274076 discloses such an apparatus for measuring the distance between vehicles.

In the related apparatus used in the inter-vehicle distance measurement apparatus, pulse light originating from a light source, such as a laser diode, is emitted as an optical beam by way of a collimator lens, and the thus-emitted optical beam is radiated onto a reflection plate which is pivotally moved within a given angular range or onto a rotating polygon mirror. The forward region is two-dimensionally scanned through use of the beam reflected from the reflection plate or the polygon mirror. For example, the inter-vehicle distance measurement apparatus described in the cited patent publication performs two-dimensional scanning operation through use of a polygon mirror.

The related apparatus is arranged so as to perform a scanning operation within a predetermined angular range through use of an optical beam, by means of pivotal movement of the reflection plate or by means of rotation of a polygon mirror. Means for deflecting an optical beam through use of such as a reflection plate or a like element requires a wider area for placement than does another constituent component, thus raising a problem in rendering the optical beam scanning apparatus compact.

Further, the related apparatus radiates an optical beam in the form of a pulse signal in synchronism with the angle of scanning. If an offset arises between the timing at which an optical beam is radiated (or illuminated) and the rotational angle (i.e., the angle of scanning) of a reflection plate or a polygon mirror, the optical beam scanning apparatus encounters a problem of inability to fully scan over the entire region which is an object of measurement. In order to work around such a problem, the first related apparatus actuates a reflection plate or a polygon mirror while maintaining a high degree of linearity relative to the timing at which an optical beam is to be radiated. To this end, a mechanism for actuating the reflection plate or the polygon mirror requires positional accuracy with a high degree of resolution.

SUMMARY OF THE INVENTION

The present invention is provided to solve the above problems. It is therefore the first object of the present invention is to provide a compact beam scanning apparatus capable of sweeping a beam, such as a laser beam, within a given angular range without involvement of optical deflection means, such as a reflection plate or a polygon mirror, and capable of appropriately sweeping a laser beam without use of a drive mechanism having a positional accuracy with a high degree of resolution.

In addition, the second object of the present invention is to provide a more practical beam scanning apparatus capable of preventing generation of heat, which would otherwise be caused by a necessity for supplying large drive power for reversing the direction of movement of optical deflection means.

In order to achieve the above objects, the apparatus of the present invention is arranged so as to directly and pivotally move a collimator lens, thorough which an optical beam originating from a light source passes, within a predetermined angular range through use of a pivot mechanism, thus obviating a necessity for optical deflection means, such as a reflection plate or a polygon mirror. Therefore, the apparatus can be made more compact than the related apparatus.

In the apparatus of the present invention, position detection means detects the position of the collimator lens actuated by the pivot mechanism. On the basis of the rotational angular position of the collimator lens, the pivotal movement of the collimator lens and the timing at which the light source is illuminated are subjected to feedback control. Accordingly, the timing at which the light source is illuminated can be accurately synchronized with the rotational angular position of the collimator lens, thus enabling appropriate scanning of a beam.

The pivot mechanism can be embodied by a magnetic drive mechanism comprising a magnet and a drive coil. In this case, in consideration of the influence imposed by inertia force or another factor, a large drive current must be supplied to the drive coil in order to reverse the direction of movement of the collimator lens being pivoted. If a large current is supplied to the drive coil, the amount of heat accumulated in the drive coil is also increased in association with the supply of the drive current. There arises a problem of deterioration of the durability of the drive coil or a problem of thermal expansion, which stems from generation of heat, thereby affecting surrounding elements.

However, according to the present invention, at the time of reversal of the moving direction during reciprocal movement, the collimator lens is imparted with urging force for mitigating the drive load in the opposite direction imposed by a collimator lens drive mechanism.

Thus, the present invention yields an advantage of the ability to diminish drive power to be supplied to the drive mechanism at the time of reversal of the moving direction of the lens, as well as an advantage of the ability to prevent heat from developing in the drive mechanism correspondingly.

DETAILED DESCRIPTION OF THE PREFERRED EMBODIMENTS

A beam scanning apparatus to which the present invention is applied will be described hereinbelow by reference to the accompanying drawings.

Figure 1A:
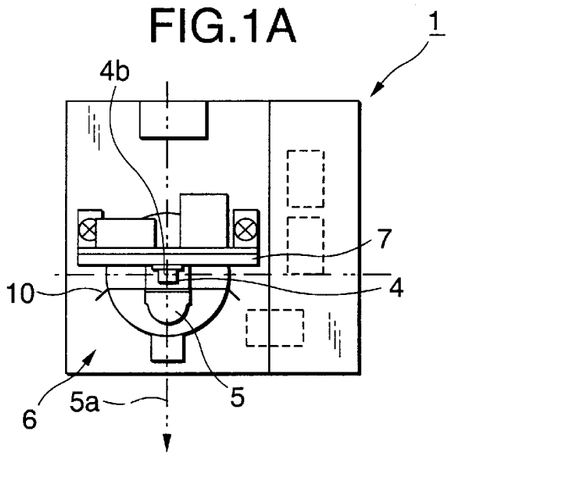
FIG. 1A is a plan view showing the principal section of an optical beam scanning apparatus suitable for use with an apparatus for measuring the distance between vehicles.
Figure 1B:
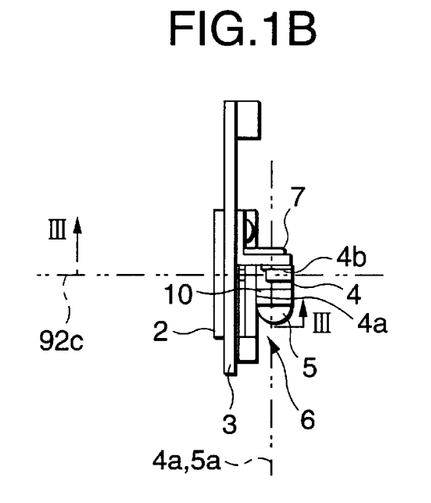
FIG. 1B a side view showing the same.
Figure 1C:
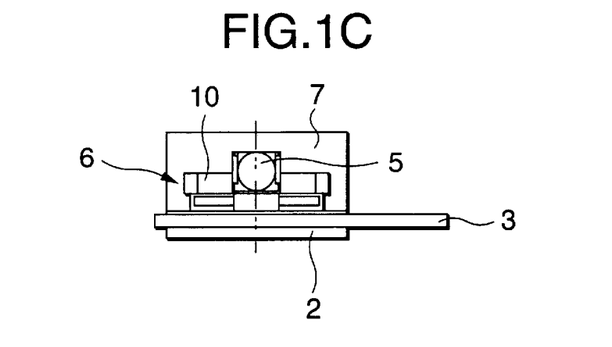
FIG. 1C front view showing the same.

FIG. 1A is a plan view showing the principal section of an optical beam scanning apparatus suitable for use with an apparatus for measuring the distance between vehicles according to a first embodiment of the present invention, FIG. 1B is a side view showing the same, and FIG. 1C is a front view showing the same. As shown in these drawings, an optical beam scanning apparatus 1 of the present embodiment comprises a rectangular support plate 2 and a circuit board 3 placed on the support plate 2. On the circuit board 3 are mounted a laser unit 4 which is a light source for emitting a laser beam, a collimator lens 5 which transforms the laser beam emitted from the laser unit 4 into a collimated light beam and emits the thus-collimated light beam, and a pivot mechanism 6 for pivotally moving the collimator lens 5 in a reciprocating manner. Further, the circuit plate 3 is provided with a leaf spring 10 which acts as a stopper mechanism and acts on the collimator lens 5 when the direction of pivotal movement of the collimator lens 5 is reversed.

Figure 2A:
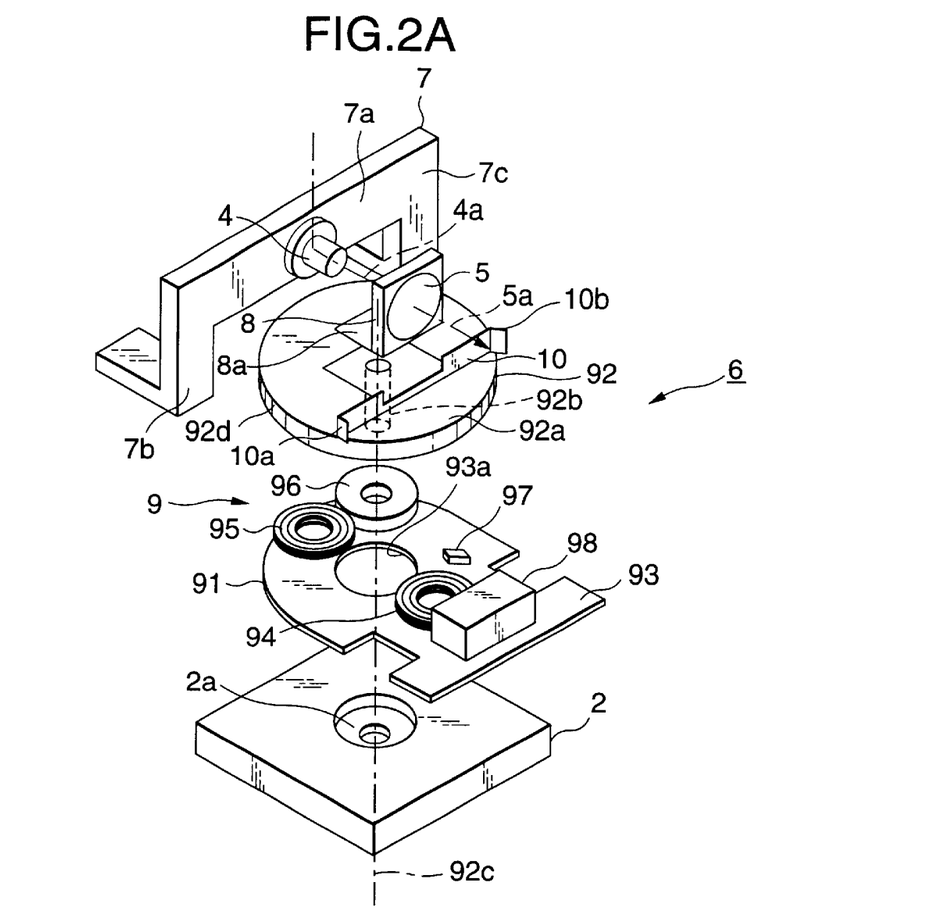
FIG. 2A is an exploded perspective view showing the principal section of the optical beam scanning apparatus shown in FIG. 1, wherein a circuit board is omitted.
Figure 2B:
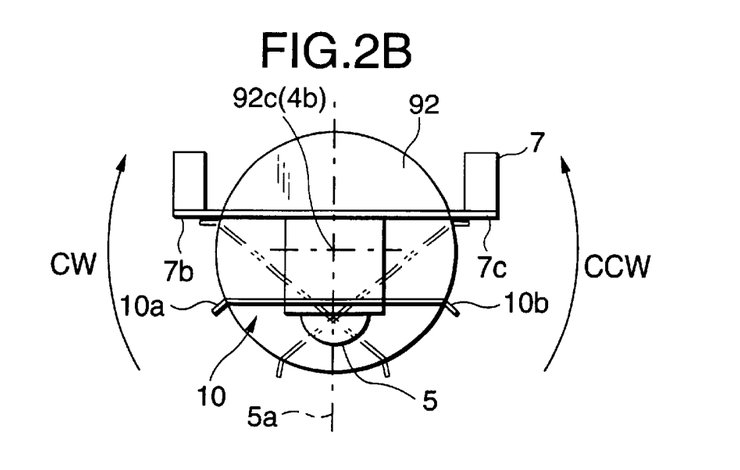
FIG. 2B is descriptive view for describing the operation of a stopper mechanism employed in the optical beam scanning apparatus.
Figure 3:
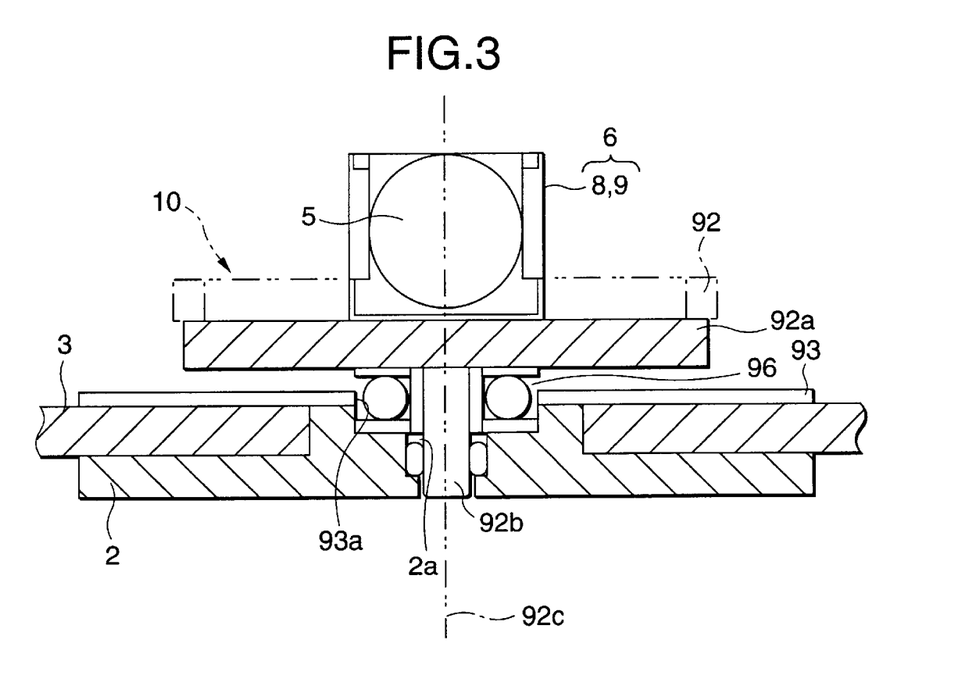
FIG. 3 is sectional view taken along line III—III shown in FIG. 1B.

FIG. 2A is an exploded perspective view showing the principal section of the optical beam scanning apparatus, wherein the circuit board 3 is omitted. FIG. 2B is a descriptive view for describing the operation of the leaf spring 10. FIG. 3 is a cross-sectional view taken along line III—III shown in FIG. 1B. The configuration of individual sections of the optical beam scanning apparatus 1 will now be described by reference to these drawings.

As shown in FIG. 2A, the laser unit 4 is mounted in the center of a horizontal section 7a of an arch-shaped support frame 7 so as to face the forward direction. The primary optical axis 4a of the laser beam emitted from the laser unit 4 is set to be aligned in the horizontal direction. The lower ends of legs 7a and 7b of the support frame 7 are bent at right angles, and by use of fastening hardware, such as screws, the thus-bent portions are fastened, by way of the circuit board 3, to the support plate 2 provided below the circuit board 3. The collimator lens 5 is situated forward of the laser unit 4 and is pivotally moved in the horizontal direction. When the collimator lens 5 is situated at an intermediate point in a path over which the collimator lens 5 is to be pivotally moved, an optical axis Sa of the collimator lens 5 is aligned with the primary optical axis 4a of the laser unit 4. Further, the optical axis 5a is set to be positioned within a horizontal plane in which the collimator lens 5 is to be pivotally moved.

The pivot mechanism 6 for pivotally moving the collimator lens 5 from left to right or vice versa will now be described. The pivot mechanism 6 comprises a lens support frame 8 for supporting the collimator lens 5 and a magnetic drive mechanism 9 for pivotally moving the lens support frame 8 from left to right or vice versa within a predetermined angular range.

The magnetic drive mechanism 9 comprises a stator 91 and a rotor 92. The stator 91 comprises a yoke plate 93 attached to the upper surface of the circuit board 3 and a pair of drive coils 94 and 95 arranged on the yoke plate 93 with a through hole 93a formed therein so as to be interposed between the drive coils 94 and 95. The rotor 92 comprises a disk-shaped rotor main body 92a and a rotary shaft 92b which protrudes downward at right angles from the center on the reverse surface of the rotor main body 92a. Two sets of magnets, each set comprising a N pole and a S pole, are formed, as rotor drive magnets, on the reverse surface of the rotor main body 92b at intervals of 90 degrees.

A shaft hole 2a is formed in the support plate 2 so as to correspond to the position of the through hole 93a formed in the yoke plate 93. The upper half of the shaft hole 2a is formed so as to assume a large diameter, and the lower half of the same is formed so as to assume a small diameter. A thrust bearing 96 is fitted into the large-diameter portion of the shaft hole. 2a, thus supporting the rotor 92 on the support plate 2 in a rotatable manner.

A center axis 92c of the rotor rotary shaft 92b is aligned with the pivotal center axis of the collimator lens 5 supported by the lens support frame 8 attached to the rotor 92. Accordingly, the center axis 92c of the rotor rotary shaft 92 is aligned with the pivotal center axis of the collimator lens 5. In the present embodiment, the pivotal center axis 92c is set to pass through a point of illumination 4b of the laser unit 4. Thus, the primary optical axis 9a of the outgoing light emitted from the laser unit 4 and the optical axis 5a of the collimator lens 5 are placed within the same horizontal plane. Further, the pivotal center axis of the collimator lens 5 is aligned with the point of illumination 4b of the laser unit 4, and hence the collimator lens 5 can be pivotally moved from left to right or vice versa around the point of illumination 4b of the laser unit 4 within the horizontal plane.

The magnetic drive mechanism 9 is equipped with position detection means for detecting the rotational position (or pivotal position) of the rotor 92. By reference to FIG. 2, the position detection means of the present embodiment will now be described. The position detection means is embodied by a hole device 97 which is provided on the surface of the yoke plate 93 so as to face the reverse surface (or a polarized surface) of the rotor main body 92a. When the rotor 92 returns to its preset reference point, the hole device 97 outputs a pulse signal representing the reference point. In the present embodiment, the magnetic drive mechanism 9 is further provided with speed control means for controlling the speed of the rotor 92. The speed control means comprises a polarized surface 92d for an FG signal (i.e., a polarized surface for generating a frequency signal) formed along the outer peripheral edge of the rotor main body 92a and a magnetic resonance device 98 which is provided on the upper surface of the yoke plate 93 so as to face the polarized surface 92d.

The leaf spring 10 is mounted on the upper surface of the disk-shaped rotor 92. The leaf spring 10 is provided so as to intersect the optical axis 5a at right angles at a forward position along the pivotal center axis 92c. Opposite ends of the leaf spring 10 are bent slightly forward, thus constituting left and right stopper pieces 10a and 10b. The right and left stopper pieces 10a and 10b protrude outward from the outer peripheral edge of the rotor 92 and are set to collide with the legs 7b and 7c of the arch-shaped support frame 7 when the rotor 92 is rotated.

Figure 4A:
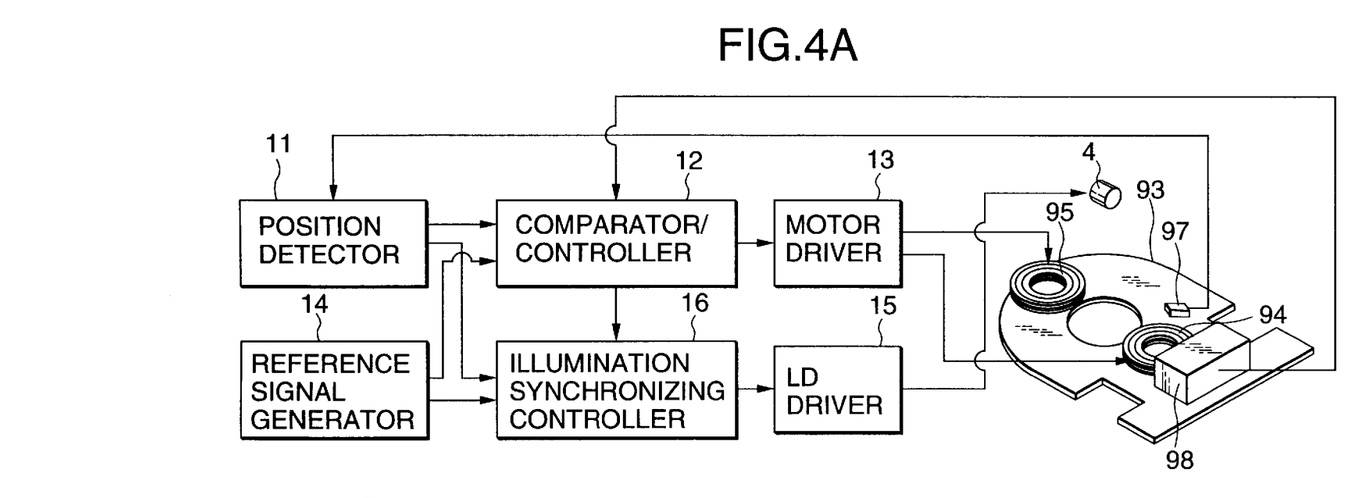
FIG. 4A is a block diagram showing the outline of a drive control system for driving the optical beam scanning apparatus shown in FIG. 1.
Figure 4B:
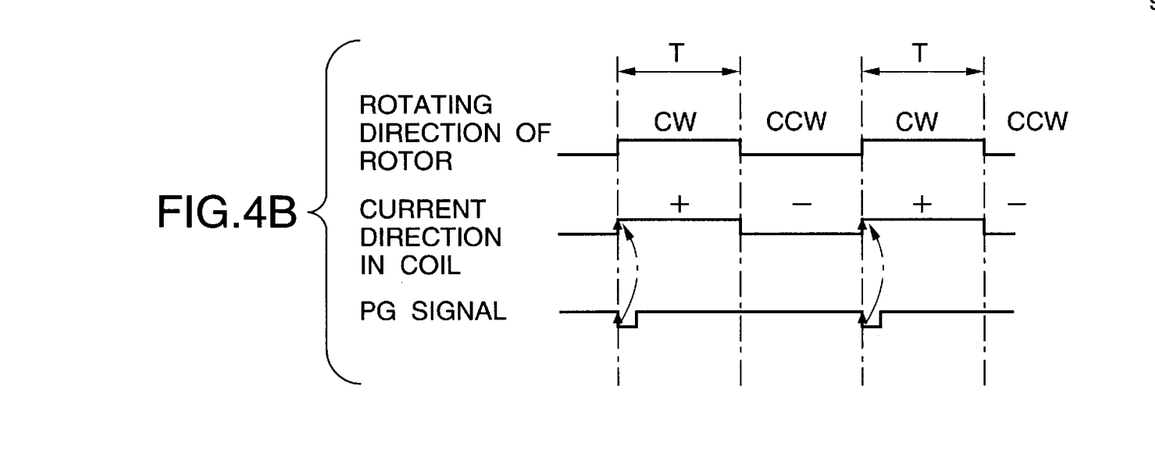
FIG. 4B is a timing chart relating to the outlined operation of the drive control system.

FIG. 4A is an outline block diagram showing a drive control system for driving the optical beam scanning apparatus 1 of the present invention, and FIG. 4B is a timing chart relating to the operation of the drive control system. As can be seen from the drawings, a position detector 11 which receives a reference position signal PG output from the hole device 97 is to detect whether or not the rotor 92 of the magnetic drive mechanism 9 has returned to the predetermined reference point. The result of the detection operation performed by the position detector 11 is supplied to a comparator/controller 12. When it is detected that the rotor 92 has returned to the reference point, the direction in which an electric current flows through the pair of drive coils 94 and 95 is reversed by way of the motor driver 13, thus switching the rotor 92 from reverse rotation to forward rotation.

The comparator/controller 12 receives a reference dock signal supplied from a reference signal generator 14. On the basis of the thus-received reference clock signal, the comparator/controller 12 counts the time which has elapsed since the rotor 92 has departed from the reference point. A point in time after elapse of a preset period of time T is taken as the other point for reversal. At this point in time, the direction in which the electric current flows through the pair of drive coils 94 and 95 is reversed by way of the motor driver 13, thus switching the rotor 92 from forward rotation to reverse rotation. Similarly, in subsequent operations, the rotor 92 is cyclically switched between forward rotation and reverse rotation. As a result, the collimator lens 5 supported by the rotor 92 is pivotally actuated from left to right or vice versa within a given angular range around the primary optical axis 4a of the laser unit 4.

The comparator/controller 12 further receives an input of detection signal (FG) output from the magnetic resonance device 98. On the basis of the detection signal output from the magnetic resonance device 98, the comparator/controller 12 further controls the speed of the rotor 92.

A built-in laser diode of the laser unit 4 is activated by means of an LD driver 15. The LD driver 15 causes the laser diode to intermittently illuminate at given timings under control of an illumination synchronizing controller 16. The timing of illumination; that is, a timing at which the laser beam is radiated onto an object to be measured, is determined in synchronism with the angle of scanning of the collimator lens 5. More specifically, the illumination synchronizing controller 16 is supplied with the reference clock signal output from the reference signal generator 14, a signal (PG) which represents the reference point (i.e., the absolute position) of the collimator lens 5 and is output from the position detector 5, and a control signal output from the comparator/controller 12. On the basis of these signals, the illumination synchronizing controller 16 determines the radiation timing, ensuring synchronization between the angle of scanning of the collimator lens 5 and the radiation timing.

In the optical beam scanning apparatus 1 that is activated and controlled in the manner as mentioned above, when the collimator lens 5 that is pivotally actuated within a predetermined angular range by means of the rotor 92 has reached a point for reversal, the stopper pieces 10a and 10b formed at opposite ends of the leaf spring 10 collide with the corresponding legs 7b and 7c of the support frame 7, whereupon a spring force acts on the rotor 92 so as to rotate the collimator lens 5 in the reverse direction.

With reference to FIG. 2B, there will be provided the next description. When the rotor 92 supporting the collimator lens 5 is rotated through a predetermined angle in the direction of forward rotation CW, the stopper piece 10a of the leaf spring 10 collides with the leg 7b of the support frame 7. Since the stopper piece 10a is formed of a leaf spring, an impactive force stemming from collision between the stopper piece 10a and the leg 7b is mitigated by elastic deformation of the stopper piece 10a. The spring force stemming from elastic deformation of the stopper piece 10a acts on the rotor 92 as a rotary force for rotating the rotor 92 in the reverse direction CCW. Similarly, even when the rotor 92 is switched from rotation in the reverse direction CCW to rotation in the forward direction CW, the other stopper piece 10b collides with the remaining leg 7b of the support frame 7, so that the spring force contributes to the force required for rotating the rotor 92 in the reverse direction.

At the time of reversal of the rotor 92, the magnetic drive mechanism 9 must temporarily generate magnetic force of great magnitude. In the present embodiment, the spring force of the stopper piece 10a contributes to the magnetic force. For this reason, the time at which the rotor 92 is reversed is set to match a point in time at which the stopper pieces 10a and 10b of the leaf spring 10 collide with the legs 7a and 7b of the support frame 7, so that the spring force of the leaf spring 10 contributes to the force required for reversing the rotor 92. Accordingly, the drive power which is to be supplied to the drive coil 95 at the time of reversal of the rotor 92 can be diminished. Consequently, the drive coil 95 can be prevented from generating heat.

Figure 5:
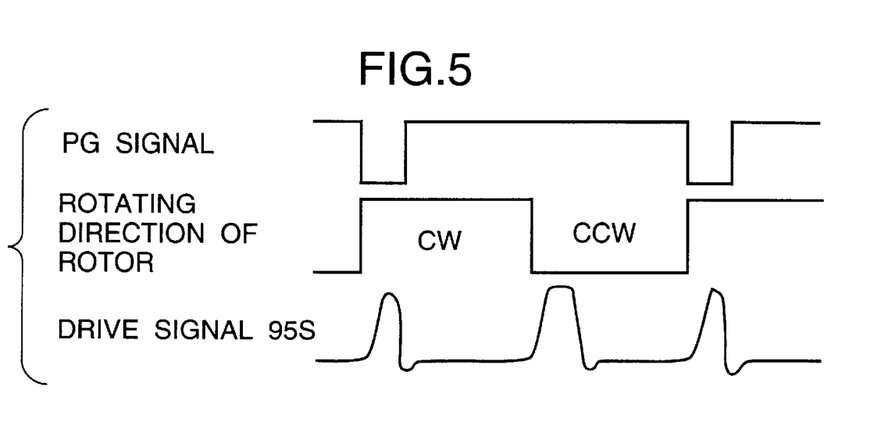
FIG. 5 s a waveform of a drive signal to be supplied to a drive coil in a case where the optical beam scanning apparatus shown in FIG. 1 does not have the stopper mechanism.
Figure 6:
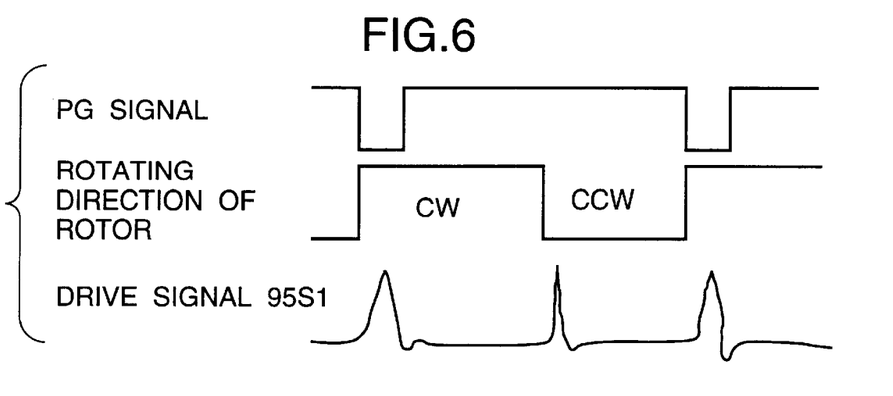
FIG. 6 shows a waveform of a drive signal to be supplied to the drive coil of the optical beam scanning apparatus shown in FIG. 1 in conjunction with a reference point signal and the direction of rotation of a rotor.

FIG. 5 shows an example result of measurement of a waveform 95S of a drive signal to be supplied to the drive coil 95 in a case where the optical beam scanning apparatus 1 does not have the leaf spring 10 whose opposite ends are formed into the stopper pieces 10a and 10b. FIG. 6 shows an example result of measurement of a waveform 95S1 of a drive signal to be supplied to a drive coil 95 which is required for achieving the same drive characteristics as those achieved in the case shown in FIG. 5.

As can be seen from these measurement results, in the present embodiment the peaks of the waveforms of the drive signals appearing at the time of reversal of the rotor 92 become smaller. In other words, the result shows that the coil drive current or voltage to be supplied to the drive coil 95 in order to reverse the rotor 92 can be diminished by means of provision of the elastic stopper pieces 10a and 10b.

Figure 8:
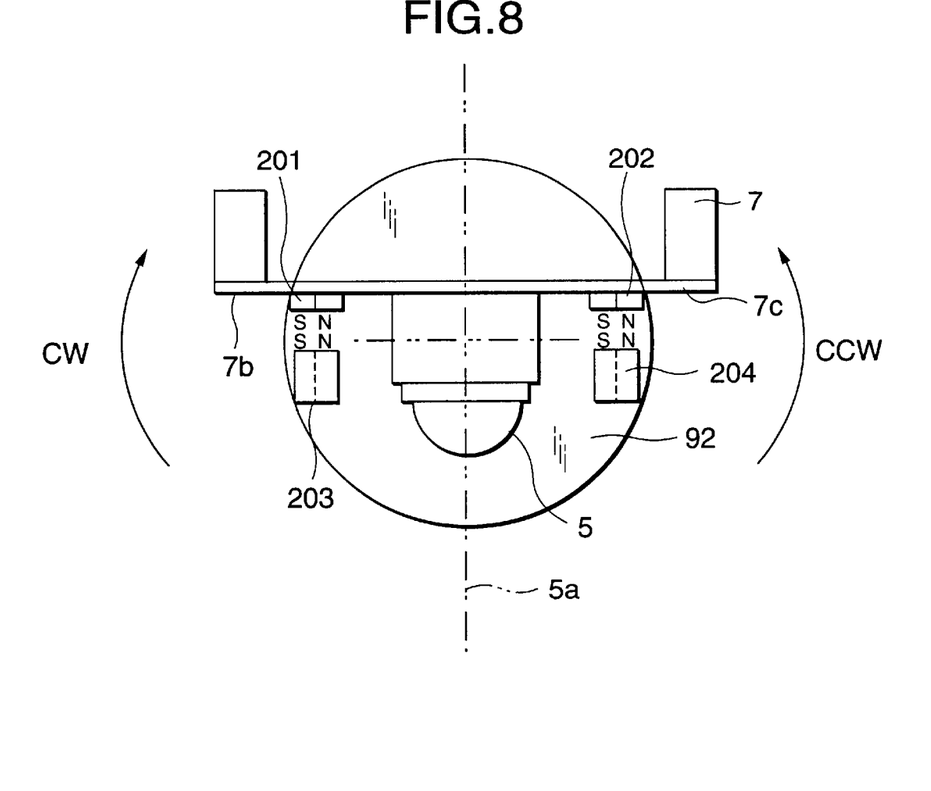
FIG. 8 a descriptive view showing a stopper mechanism which generates magnetic repulsion.

FIG. 8 shows a second embodiment of the present invention which incorporates another stopper mechanism. A magnet 201 is attached to the leg 7b of the support frame 7, and a magnet 202 is attached to the leg 7c of the support frame 7. Magnets 203 and 204 are attached to the rotor 92. The stopper mechanism is made up of these magnets 201 to 204. More specifically, the magnets 201 and 203 are mounted so as to be mutually opposed with a nominal clearance therebetween when the rotor 92 is rotated forward through a given angle. Similarly, the magnets 202 and 204 are mounted so as to be mutually opposed with a nominal clearance therebetween when the rotor 92 is rotated in reverse through the same angle. The magnets 201 and 203 that can be mutually opposed are arranged such that the same magnetic poles are mutually opposed. Similarly, the magnets 202 and 204 that can mutually oppose are arranged such that the same magnetic poles are mutually opposed.

Even in the stopper mechanism of such a configuration, when the rotor 92 is rotated through a given angle in one direction, the magnets 201 and 203 or the magnets 202 and 204 are mutually opposed, thus generating magnetic repulsion. Even in this example, the timing at which the rotor 92 is reversed is set to be identical with the timing at which the magnets repel each other. The drive power to be supplied to the drive coil 95 at the time of reversal of the rotor 92 can be diminished by utilization of the magnetic repulsion. Accordingly, the heat developing in the drive coil 95 can be diminished.

Figure 7:
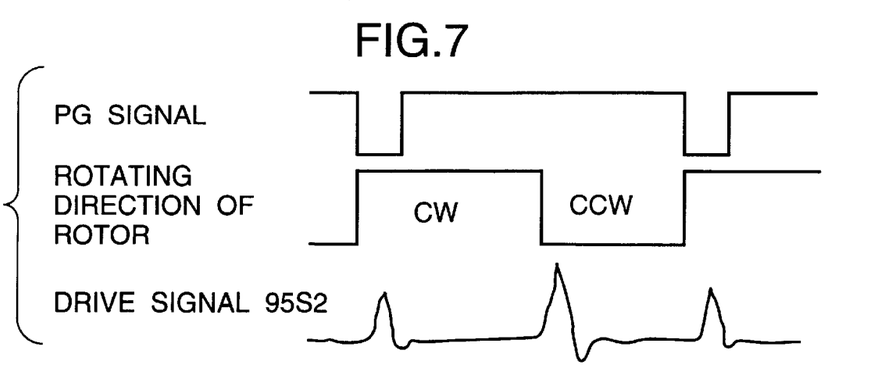
FIG. 7 shows a waveform of a drive signal to be supplied to the drive coil of the optical beam scanning apparatus shown in FIG. 1 in conjunction with a reference point signal and the direction of rotation of a rotor in a case where the optical beam scanning apparatus shown in FIG. 1 is provided with a stopper mechanism for producing magnetic repulsion.

FIG. 7 shows an example result of measurement of a waveform 95S2 of a drive signal to be supplied to the drive coil 95 in order to obtain the same drive characteristics as those achieved in the cases shown in FIGS. 5 and 6. As can be seen from the drawings, even in a case where a stopper mechanism utilizing magnetic force is employed, a drive current or drive voltage required for reversing the rotor 92 can be diminished. The only requirement for achieving a drive signal of the same magnitude required for reversing the rotor 92 at each reversal timing is that the magnitude of magnetic repulsion developed in the magnet pair 201, 203 be equal to that developed in the magnetic pair 202, 204.

Although the magnets 201 to 204 constitute a single set of magnetic poles, magnets having a plurality of sets of magnetic poles may also be used.

As has been described heretofore, according to the present invention, the optical beam scanning apparatus 1 obviates a necessity for a reflection plate or a polygon mirror, thereby enabling configuration of a considerably compact optical beam scanning apparatus. The laser unit 4 is disposed at the pivotal center of pivot members, such as the rotor 92, the lens support frame 8, and the collimator lens 5. In comparison with a mechanism of the related art in which a laser unit is disposed outside the pivotal path of a pivot member, the optical beam scanning apparatus enables arrangement of individual elements within a small space. For this reason, the optical beam scanning apparatus can be made more compact. With regard to synchronization between the timing at which the laser unit 4 is illuminated (i.e., radiation timing) and the angle of scanning of the collimator lens 5, the radiation timing can be subjected to feedback control on the basis of the absolute rotational angular position of the collimator lens 5. Therefore, there is obviated a necessity for a drive mechanism which has a high degree of positional accuracy with a high degree of resolution and achieves a high degree of linearity, which would be required by the optical beam scanning apparatus of the related art in order to achieve accuracy synchronism with the radiation timing. Further, the optical beam scanner of the present invention eliminates the possibility of occurrence of an offset in synchronization between the radiation timing and the angle of scanning, which would otherwise arise in the optical beam scanning apparatus of the related art.

Furthermore, according to the optical beam scanning apparatus 1 of the present invention, a laser beam emitted from the collimator lens 5 is swept from left to right or vice versa over a given angular range, by directly pivoting the collimator lens 5 disposed forward of the laser unit 4 from left to right or vice versa.

Although in the previous embodiments the optical beam scanning apparatus has a single laser unit 4, two or more laser units may be provided to the optical beam scanning apparatus. In such a case, a plurality of laser units may be arranged in the vertical direction, and collimator lens may be provided in the same number as and forward of the corresponding laser units.

The magnetic drive mechanism 9 of the previous embodiments is of a so-called plane-to-plane drive mechanism, wherein the drive coils oppose the magnets in the direction of the rotary axis of the rotor 92. There may also be employed a magnetic drive mechanism of so-called periphery-to-periphery drive mechanism, wherein the drive coils oppose the magnets in a radial direction with the center of rotation of the rotor 92 therebetween.

In the previous embodiments, the optical beam scanning apparatus 1 has a pivot mechanism for pivotally moving the collimator lens 5 from left to right or vice verse around the pivotal center over a predetermined angular range. The laser beam can be swept over a predetermined range by linearly and reciprocally moving the collimator lens 5 rather than pivotally moving the collimator lens 5. For example, the collimator lens 5 can be linearly and reciprocally moved by utilization of a voice coil motor.

Figure 9:
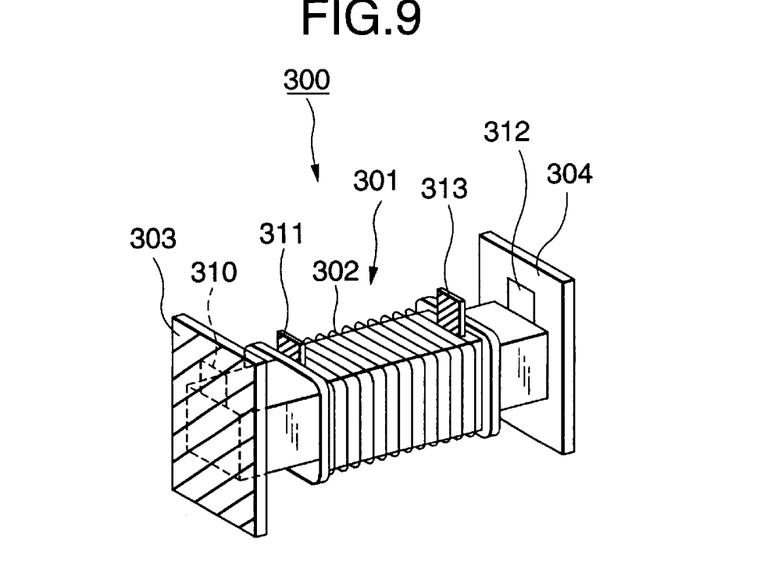
FIG. 9 is block diagram schematically showing the principal section of a linear drive mechanism.

FIG. 9 shows a third embodiment of the present invention which incorporates a drive mechanism for linearly and reciprocally moving the collimator lens 5 through use of a voice coil motor. In the linear drive mechanism 300, a collimator lens is attached to a voice coil 302 for linearly and reciprocally moving the voice coil motor 301, and a stopper mechanism for generating magnetic repulsion can be attached to support plates 303 and 304 provided for defining the opposite ends of a path over which the voice coil 302 is to travel. The stopper mechanism comprises a magnet 310 attached to the support plate 303, a magnet 311 which opposes the magnet 310 and is attached to the bobbin end face of the voice coil 302, a magnet 312 attached to the support plate 304, and a magnet 313 which opposes the magnet 312 and is attached to the bobbin end face of the voice coil 302.

Even in this case, as in the second embodiment shown in FIG. 8, magnetic poles are formed in the respective magnets such that magnetic poles of the same polarity are mutually opposed so as to produce magnetic repulsion between the opposing magnets.

Even in the linear drive mechanism of the foregoing configuration, drive force in the opposite direction is generated by magnetic repulsion when the linear movement of the collimator lens is reversed. Accordingly, the power supplied to the voice coil 302 when the linear movement of the collimator lens is reversed can be diminished, and hence the voice coil 302 and the drive circuit can be prevented from generating heat.

A spring member in place of a magnet may be used for the stopper mechanism.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed:

1. A beam scanning apparatus for scanning a target region through use of an optical beam, comprising:

a light source emitting light;

a collimator lens transforming the light emitted from the light source into a parallel optical beam;

a drive mechanism for directly moving the collimator lens along a predetermined travel path reciprocally while the primary optical axis of the light emitted from the light source and the optical axis of the collimator lens are placed in a single plane in order to sweep the optical beam over the target region; and a stopper mechanism for limiting the movement of the collimator lens to mitigate load imposed on the drive mechanism for reversing the direction of movement of the collimator lens, the stopper mechanism provided at at least one of the points where the direction of reciprocal movement of the collimator lens is switched from one to the other.

2. The beam scanning apparatus as set forth in claim 1, wherein the drive mechanism includes:

a driven member for supporting the collimator lens;

a support member for supporting the driven member in a reciprocally movable manner; and a magnetic drive mechanism composed of magnets and a drive coil which produce magnetic drive force between the driven member and the support member, and wherein the stopper mechanism is interposed between the driven member and the support member to generate urging force for damping the reciprocal movement of the driven member.

3. The beam scanning apparatus as set forth in claim 2, wherein the driven member is a rotatable rotor having rotor magnets and a polarized surface for generating a frequency, and wherein the support member includes drive coils provided so as to face the respective rotor magnets and detection means for detecting a reference position of the rotor.

4. The beam scanning apparatus as set forth in claim 2, wherein the stopper mechanism includes a spring member for generating the urging force by means of elastic deformation thereof.

5. The beam scanning apparatus as set forth in claim 2, wherein the stopper mechanism includes a pair of magnets provided such that the same magnetic poles of the magnets being mutually opposed, and wherein one of the magnets is attached to the driven member, and the other magnet is attached to the support member, whereby the urging force is produced by means of magnetic repulsion developing in the magnet pair.

6. The beam scanning apparatus as set forth in claim 2, wherein the drive mechanism is a pivot mechanism for pivotally moving the collimator lens within a given range, and wherein the center of pivotal movement of the collimator lens imparted by the pivot mechanism is placed on an extension of the optical axis of the collimator lens at a location closer to the light source than to the collimator lens.

7. The beam scanning apparatus as set forth in claim 6, wherein the pivotal center of the collimator lens is set to a position where the light emitting point of the light source.

8. The beam scanning apparatus as set forth in claim 6, further comprising detection means for detecting the pivotal position of the collimator lens defined by the pivot mechanism, and wherein the reciprocal movement of the collimator lens is controlled in accordance with the result of the detection performed by the lens position detection means.

9. The beam scanning apparatus as set forth in claim 8, wherein radiation of the light source is controlled on the basis of the result of the detection performed by the lens position detection means.

10. The beam scanning apparatus as set forth in claim 2, wherein the drive mechanism is a mechanism for linearly and reciprocally moving the collimator lens within a given range.

11. The beam scanning apparatus as set forth in claim 10, further comprising detection means for detecting the position of the collimator lens defined by the linear drive mechanism, and wherein the reciprocal movement of the collimator lens is controlled in accordance with the result of the detection performed by the lens position detection means.

12. The beam scanning apparatus as set forth in claim 11, wherein radiation of the light source is controlled on the basis of the result of the detection performed by the lens position detection means.

13. The beam scanning apparatus as set forth in claim 1, wherein the primary optical axis of the light emitted from the light source is aligned with the optical axis of the collimator lens when the collimator lens is situated at the center position of the reciprocal movement.

14. The beam scanning apparatus as set forth in claim 1, wherein the stopper mechanism is provided at each of the points where the direction of reciprocal movement of the collimator lens is switched from one to another.

15. The beam scanning apparatus as set forth in claim 14, wherein the drive mechanism is a pivot mechanism for pivotally moving the collimator lens within a given range, and wherein the center of pivotal movement of the collimator lens imparted by the pivot mechanism is placed on an extension of the optical axis of the collimator lens at a location closer to the light source than to the collimator lens.

16. The beam scanning apparatus as set forth in claim 14, wherein the primary optical axis of the light emitted from the light source is aligned with the optical axis of the collimator lens when the collimator lens is situated at the center position of the reciprocal movement.

* * * * *